United States Patent [19]
Onozuka

[11] Patent Number: 5,500,692
[45] Date of Patent: Mar. 19, 1996

[54] IMAGE PROJECTING APPARATUS FOR PRODUCING AN IMAGE FOR DISPLAY ON A PROJECTION SCREEN

[75] Inventor: Kuniharu Onozuka, Kanagawa, Japan

[73] Assignee: Sony Corporation, Tokyo, Japan

[21] Appl. No.: 173,043

[22] Filed: Dec. 27, 1993

[30] Foreign Application Priority Data

Dec. 28, 1992 [JP] Japan .................... 4-360122

[51] Int. Cl.$^6$ .................... H04N 9/31; G02F 1/1335
[52] U.S. Cl. .................... 348/759; 348/766; 348/757; 359/41; 359/83
[58] Field of Search .................... 348/744, 745, 348/746, 751, 756, 757, 761, 766; 359/40, 41, 54, 71, 49, 36; 353/31, 34; H04N 9/31

[56] References Cited

U.S. PATENT DOCUMENTS

| | | | |
|---|---|---|---|
| 4,639,106 | 1/1987 | Gradin | 353/13 |
| 5,052,783 | 10/1991 | Hamada | 359/40 |
| 5,126,863 | 6/1992 | Otsuka et al. | 359/41 |
| 5,144,462 | 9/1992 | Otsuka et al. | 359/41 |
| 5,261,645 | 11/1993 | Huffman | 254/267 |

FOREIGN PATENT DOCUMENTS

| | | |
|---|---|---|
| 0516479 | 12/1992 | European Pat. Off. . |
| 0062131 | 12/1985 | Japan .................... 359/41 |
| 0089025 | 3/1990 | Japan .................... 359/41 |
| 3267918 | 11/1991 | Japan .................... 359/41 |
| 5346578 | 12/1993 | Japan .................... 359/41 |

OTHER PUBLICATIONS

Patent Abstracts of Japan vol. 15, No. 59 (P-1165) 13 Feb. 1991 & JP-A-02 287 586 (Sony) 27 Nov. 1990.

*Primary Examiner*—James J. Groody
*Assistant Examiner*—Michael H. Lee
*Attorney, Agent, or Firm*—William S. Frommer; Alvin Sinderbrand

[57] ABSTRACT

An image projector apparatus for producing an image for display on a projection screen. The image projector apparatus includes a plurality of first microlenses each receiving light from a light source, a liquid crystal display having a plurality of pixels each adapted to receive light from a respective one of the first microlenses and provide respective image light therefrom in response to image information supplied thereto, a plurality of second microlenses each receiving the image light from a respective one of the pixels and projecting parallel image light therefrom, and a projection lens receiving the parallel image light from each of the second microlenses and projecting the same onto the projection screen. The projection lens may be moved or positioned such that an optical center axis thereof is offset from an image center axis of the liquid crystal display so as to eliminate or minimize a so-called keystone distortion.

15 Claims, 7 Drawing Sheets

IMAGE PROJECTING APPARATUS FOR PRODUCING AN IMAGE FOR DISPLAY ON A PROJECTION SCREEN

BACKGROUND OF THE INVENTION

1. Field of the Invention

This invention relates to an image projector apparatus for producing an image for display and, more particularly, to such apparatus in which a light beam from a light source is transmitted through an image medium so as to provide the light with image information and project the light therefrom.

2. Description of the Prior Art

In the prior art, transmission light adjusting image projectors may increase the size of a picture so as to enable a number of people to view the picture. An example of such a projector is illustrated in FIG. 10. As shown therein, a projector 45 generally includes a light source 10, a liquid crystal display (LCD) 11, a projection lens 12, a signal processing device 43, and an optical control circuit 44.

In the projector 45, a light beam is radiated from the light source 10 to a plurality of pixels (not shown) contained in the LCD 11. An image signal is supplied from an input terminal 42 to the signal processing device 43, whereupon the image signal is processed in a predetermined manner and supplied therefrom to the optical control circuit 44 which, in turn, generates an optical control signal in accordance with the processed image signal. The optical control signal is supplied to the LCD 11 so as to control the opening and closing of a shutter of the LCD, thereby controlling the transmittance of each pixel of the LCD. As a result, an image may be projected from the LCD 11 through the projection lens 12 onto a projection screen 13.

In the projector 45, the light source 10 normally radiates a relatively high intensity level of light to compensate for the reduction of luminance caused by the relatively high expansion or enlargement of an image. Further, each of the pixels in the LCD 11 has a relatively small opening corresponding thereto for enabling light transmission. As a result, the luminance level of the image radiated from the LCD and projected onto the projection screen 13 is relatively low. Furthermore, the operating life of a lamp typically used as the light source 10 is relatively short and the power consumption is relatively high.

Thus, it is desirable to effectively utilize the radiated light from the light source 10 and to increase the efficiency of the radiated light transmitted through the LCD 11 so as to eliminate or minimize the amount in which the luminance level is lowered. Such increased efficiency may enable a lamp which provides a lower intensity level of light, and which has a lower power consumption and dissipates a corresponding lesser amount of heat, to be used.

The sizes of the open portions of the LCD 11, or opening ratio, which respectively correspond to the pixels, are controlled by a shielding mask (not shown), which may be arranged on the incident side of the LCD. By decreasing the area of the shielding mask, the size of the open portions of the LCD may be increased as viewed from the incident surface thereof.

Due to the shielding mask and the relatively small sized open portions of the LCD 11, and when the distance from the screen 13 is increased and the picture is enlarged, the image projected on the projection screen may appear grainy, thereby resulting in an image or picture having relatively poor quality.

Further, as shown in FIG. 10, the distance between the projection lens 12 and the projection screen 13 is represented by "a", while the distance between the LCD 11 and the projection lens is represented by "b". Accordingly, the focal length of the projection lens 12 may be determined by the following equation:

$$(1/a)+(1/b)=(1/f) \tag{1}$$

As a result of the distances a and b, the image projected on the projected screen 13 is approximately b/a times larger than the image on the LCD panel. As is apparent from equation 1, the focus of the image is dependent upon the distance from the projection screen 13.

The projector 45 may be utilized in an airplane or the like. In such situation, the projector 45 is suspended from the ceiling so as not to disturb the passengers and the projection screen 13 is positioned so as to be visible by the passengers. Due to such positioning of the projector 45 and the projection screen 13, a center axis of the projector is not perpendicular to the projection screen. As a result, a so-called keystone distortion may be produced. FIG. 11 illustrates such arrangement between the projector 45 and the projection screen 13.

As an example of such keystone distortion, consider the situation in which an image of a square object is radiated from the projector 45 for display on the projection screen 13, in which the projector and projection screen are mounted in an airplane in the manner previously described. In this situation, instead of a square shape, the object displayed on the projection screen 13 has a trapezoidal shape.

Such keystone distortion may be reduced by using a projection lens 12 having a relatively large diameter. However, using such large diameter projection lens has several disadvantages. That is, such projection lens may cause the image light radiated therefrom to have a relatively large diameter, thereby lowering the light volume or luminarice level of the image projected on the projection screen 13. Further, as is to be appreciated, the use of such large diameter projection lens may increase the size and cost of the projector 45.

The size of the projector 45 is normally relatively large. That is, as previously described, the projection lens used to reduce keystone distortion is relatively large and, as such, causes the projector to be relatively large. However, even the "other" projection lens has a large diameter which still causes the projector to be relatively large. Further, due to the distance b normally required between the LCD 11 and the projection lens 12, the projector 45 typically has a relatively large length or depth. Accordingly, due to the diameter of the projection lens and the distance b, it is difficult to construct the projector 45 so as to have a relatively small size.

Thus, the prior art has failed to provide a relatively small-sized and low cost projector for producing an image for display on a projection screen having relatively good picture quality, which is capable of correcting keystone distortion and adjusting the focus.

OBJECTS AND SUMMARY OF THE INVENTION

An object of the present invention is to provide an image projecting apparatus which overcomes the problems associated with the prior art.

More specifically, it is an objects of the present invention to provide an image projecting apparatus having an image information radiating unit having a LCD, and first and second lens devices each having a plurality of microlenses and arranged adjacent to an incident side and a radiating side of the LCD, respectively, for effectively utilizing light supplied from a light source so as to provide an image for eventual display on a projection screen having relatively high picture quality.

Another object of the present invention is to provide an image projecting apparatus as aforesaid in which an optical center axis of a projection lens arranged to receive the image light from the image information radiating unit may be shifted or positioned so as to be offset from an image center axis of the LCD so as to produce an image for display on the projection screen without any keystone distortion.

Still another object of the present invention is to provide an image projecting apparatus as aforesaid in which the projection lens may be moved along the optical center axis so as to adjust an image displayed on the projection screen.

Yet another object of the present invention is to provide an image projecting apparatus as aforesaid in which another projection lens is arranged between the image information radiating unit and the other projection lens so as to enable the desired size of the displayed picture to be relatively easily controlled without being sensitive to the focus thereof.

A further object of the present invention is to provide an image projecting apparatus as aforesaid which has a relatively small size and which can be fabricated for a relatively low cost.

A still further object of the present invention is to provide an image projecting apparatus as aforesaid which is adapted to be mounted on the ceiling of an aircraft or the like.

In accordance with an aspect of the present invention, an image projecting apparatus for producing an image for display on a projection screen is provided. The apparatus comprises means for supplying light, and first lens means having a plurality of first microlenses. Each of the first microlenses is adapted to receive light from the light means and to respectively project the received light therefrom. The apparatus further comprises a LCD having a plurality of pixels arranged in matrix form and a shielding mask arranged adjacent to the plurality of pixels so as to separate each of the pixels. Each of the pixels receives light from a respective one of the first microlenses and projects respective image light therefrom. The apparatus still further comprises second lens means having a plurality of second microlenses each of which receives the image light from a respective one of the plurality of pixels in the LCD and projects parallel image light therefrom. The apparatus further comprises projection lens means which receives the parallel image light from each of the second microlenses and projects the same onto the projection screen.

Other objects, features and advantages according to the present invention will become apparent from the following detailed description of illustrated embodiments when read in conjunction with the accompanying drawings in which corresponding components are identified by the same reference numerals.

DETAILED DESCRIPTION OF THE PREFERRED EMBODIMENTS

Figure 1:
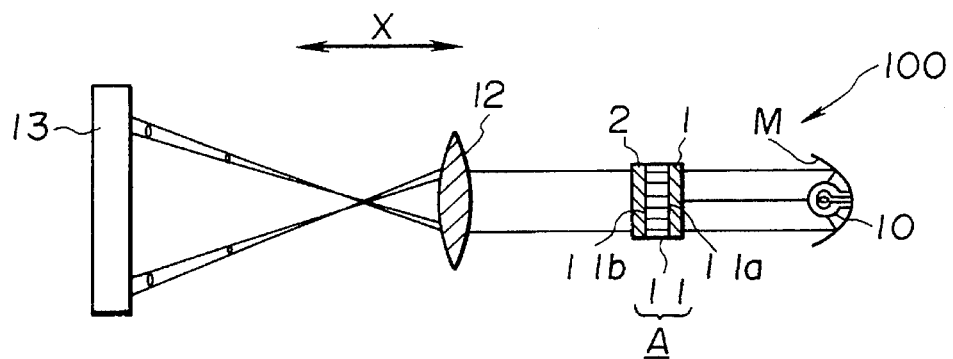
FIG. 1 is a schematic diagram of an image projector apparatus according to an embodiment of the present invention.

FIG. 1 illustrates an image projector apparatus 100 having an optical system in accordance with a first embodiment of the present invention. As shown therein, the image projector apparatus 100 includes a light source 10, an LCD 11, a projection lens 12 and a projection screen 13, which may be similar to those of the projector 45 of FIG. 10. The image projector apparatus 100 further includes first and second micro multi-lens devices 1 and 2, respectively. Although not shown, the image projector apparatus still further includes a signal processing device and an optical control circuit, which may function in manner similar to that of the signal processing device 43 and the optical control circuit 44 of the projector 45 of FIG. 10.

As previously described, the LCD 11 includes a plurality of pixels, such as approximately 300,000 pixels.

In the image projector apparatus 100, light is radiated from the light source 10 onto a mirror M whereat the light is collimated and projected onto the first micro multi-lens device 1. The first micro multi-lens device 1 includes a plurality of microlenses which are each adapted for respectively converging received light to one of the pixels on a light incident surface 11a of the LCD 11. The second micro multi-lens device 2 includes a plurality of microlenses which are each adapted for respectively collimating light transmitted through one of the pixels from a light radiating surface 11b of the LCD 11. The collimated light from each of the microlenses of the second micro multi-lens device 2 is projected onto the projection lens 12 which, in turn, is adapted to expand the incident light by positive refraction and to project the light onto a projection screen 13 so as to produce an image thereon. The micro multi-lens device 1, the LCD 11 and the micro multi-lens device 2 may be integrally arranged so as to form an image information radiating portion A as shown in FIG. 1.

As previously mentioned, the image projector apparatus 100 includes a signal processing device and an optical control circuit. In a manner similar to that described with reference to the projector 45 of FIG. 10, a control signal, which is utilized for providing image information, may be produced from an input image signal and supplied to the LCD 11. In response to such control signal, the LCD 11 controls the light volume transmitted through each of the pixels.

Figure 2:
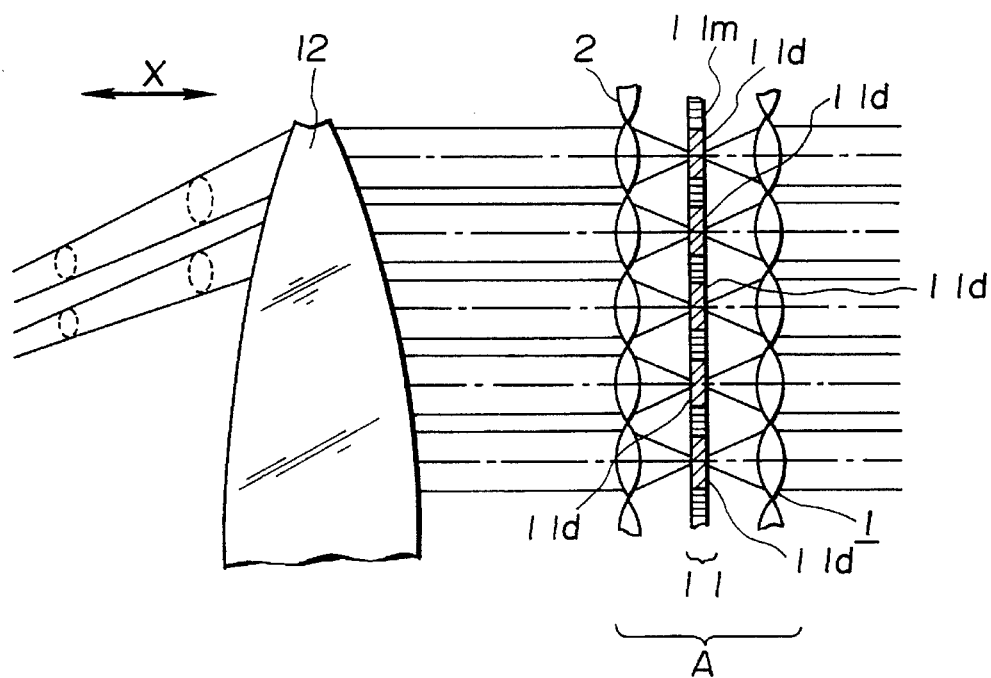
FIG. 2 is a schematic diagram of a cross-sectional side view of an image information radiating portion of the image projector apparatus of FIG. 1.

FIG. 2 illustrates a cross-sectional side view of an enlarged portion of the image projector apparatus 100 of FIG. 1. As shown therein, the LCD 11 includes a shielding mask 11m which is adapted to control or limit the light supplied to each of the pixels 11d. As further shown in FIG. 2, each of the microlenses of the micro multi-lens devices 1 and 2 are respectively arranged so as to correspond to one of the pixels 11d. The micro multi-lens devices 1 and 2 may function in a manner similar to a relay lens.

More specifically, collimated light from the light source 10 (FIG. 1) is projected to each of the microlenses of the micro multi-lens device 1, whereupon the light of each microlens is converged to a corresponding one of the pixels. The light from each of the pixels is respectively projected to a corresponding one of the microlenses of the micro multi-lens device 2, whereupon the incident light is collimated and radiated therefrom so as to be projected on the projection lens 12. The projection lens 12, which may be a convex type lens, forms a respective light beam, similar to a light spot, corresponding to each pixel 11d of the LCD 11. The projection lens 12 projects each of the light beams onto the projection screen 13.

Figure 10:
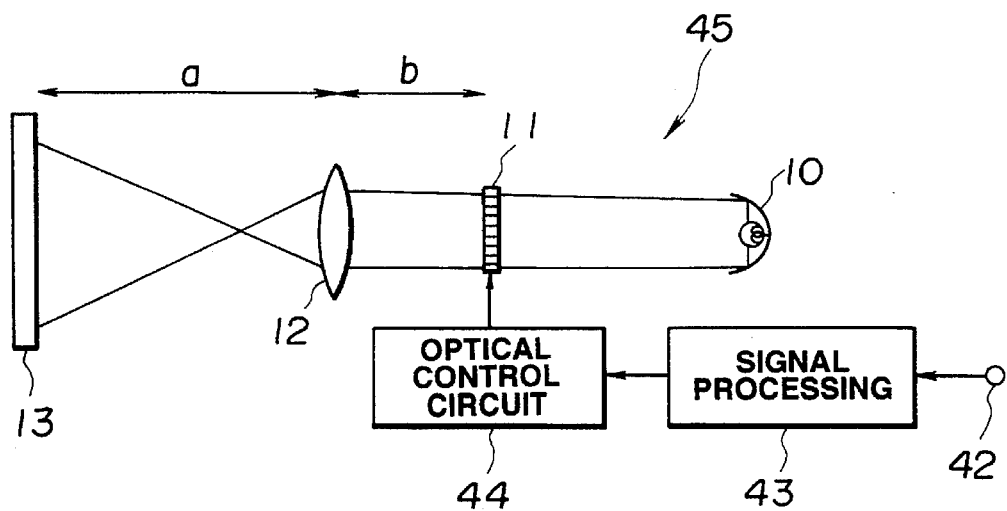
FIG. 10 is a schematic diagram of a transmission light adjusting image projector according to the prior art.

By utilizing the micro multi-lens devices 1 and 2, the image projector apparatus 100 uses the light from the light source 10 in an effective manner so as to eliminate or minimize the reduction in the luminance level thereof, which might otherwise occur, and provides an image picture on the projection screen 13 having acceptable picture quality, unlike the grainy and unacceptable picture obtained by using the projector 45 of FIG. 10. That is, converging the light from the light source 10 by the micro multi-lens device 1, as previously described, is effectively similar to enlarging the "open area" of the pixels 11d. Further, collimating the transmitted light from each of the pixels 11d by the micro multi-lens device 2, as previously described, improves the resolution, and accordingly the picture quality, of the displayed image.

The projection lens 12, which is located between the micro multi-lens 2 and the projection screen 13 as illustrated in FIG. 1., may be moved along an X direction (FIGS. 1 and 2).

Figure 3:
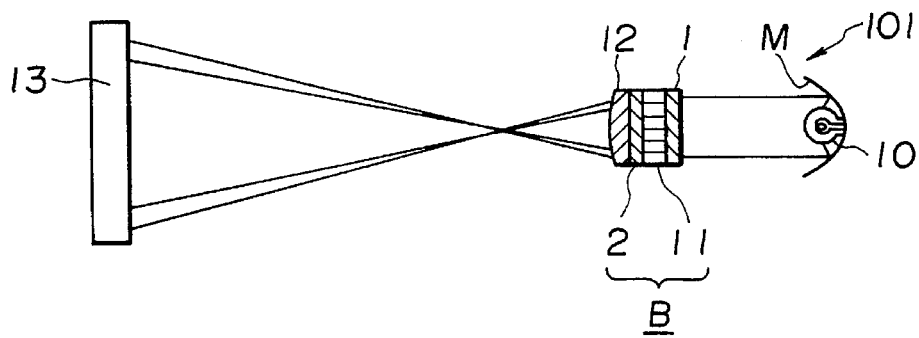
FIG. 3 is a schematic diagram of the image projector apparatus of FIG. 1 having an optical block formed of the image information radiating portion and a projection lens.

The projection lens 12 may be located near or adjacent to the micro multi-lens device 2 and integrally formed with the image information radiating portion A so as to form an optical block B as illustrated in FIG. 3. The optical block B of an image projector apparatus 101 will now be more fully described with reference to FIGS. 4A and 4B.

Figure 4A:
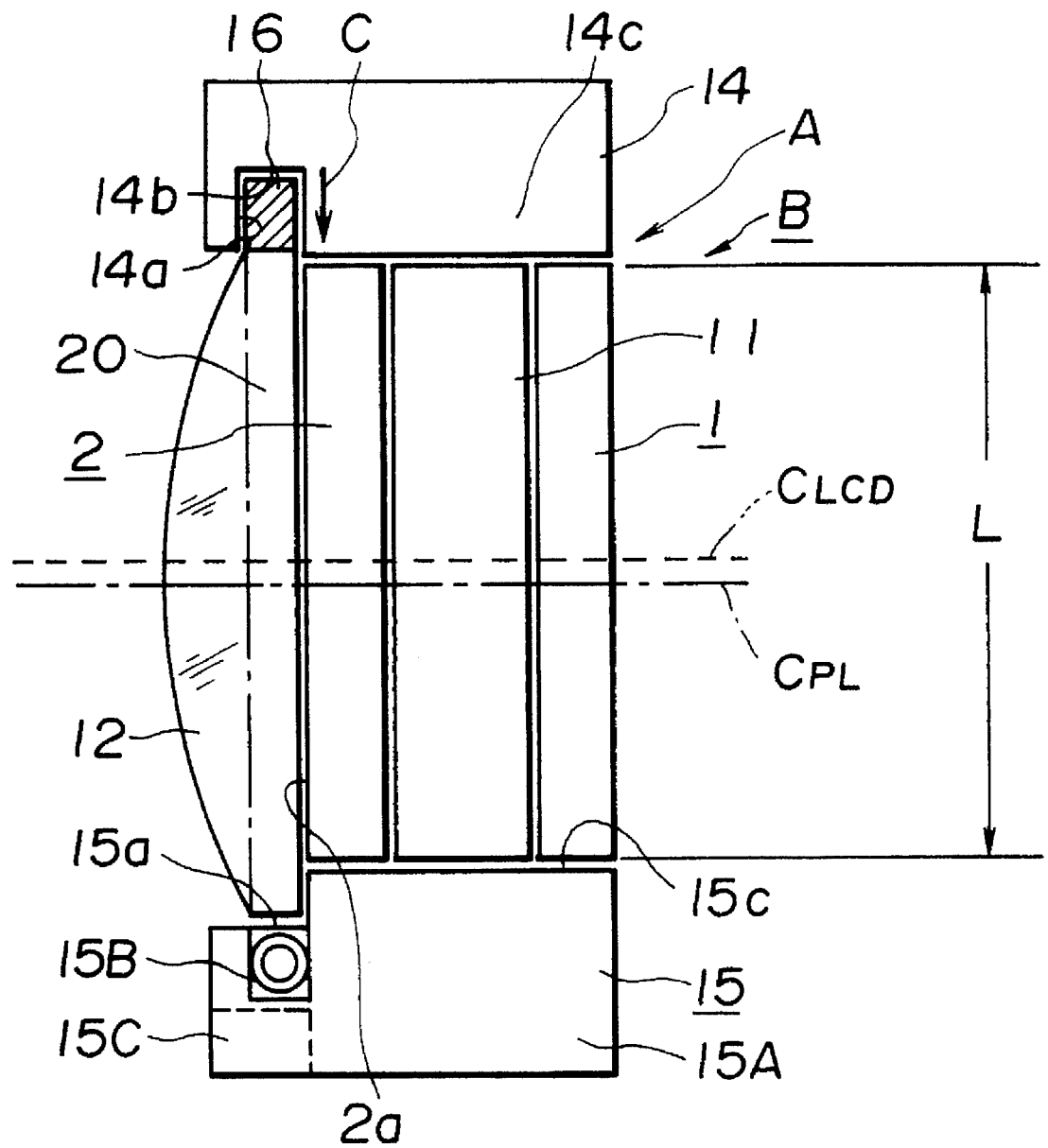
FIG. 4A is a schematic diagram of a side view of the optical block of FIG. 3.

As shown in FIG. 4A, the optical block B generally includes the image information radiating portion A (which includes the first and second micro multi-lens devices 1 and 2, and the LCD 11), the projecting lens 12, and holding members 14 and 15. The holding members 14 and 15 are provided for securing the first and second micro multi-lens devices 1 and 2, respectively, the LCD 11, and the projection lens 12.

The first micro multi-lens device 1, the LCD 11 and the second micro multi-lens device 2, each of which is arranged as in the previously described image information radiating portion A, are positioned adjacent to surfaces 14c and 15c of the holding members 14 and 15, respectively, so as to be secured therein. Each of the first and second micro multi-lens devices 1 and 2, respectively, and the LCD 11 has a substantially similar square or rectangular shape with a length L.

Figure 4B:
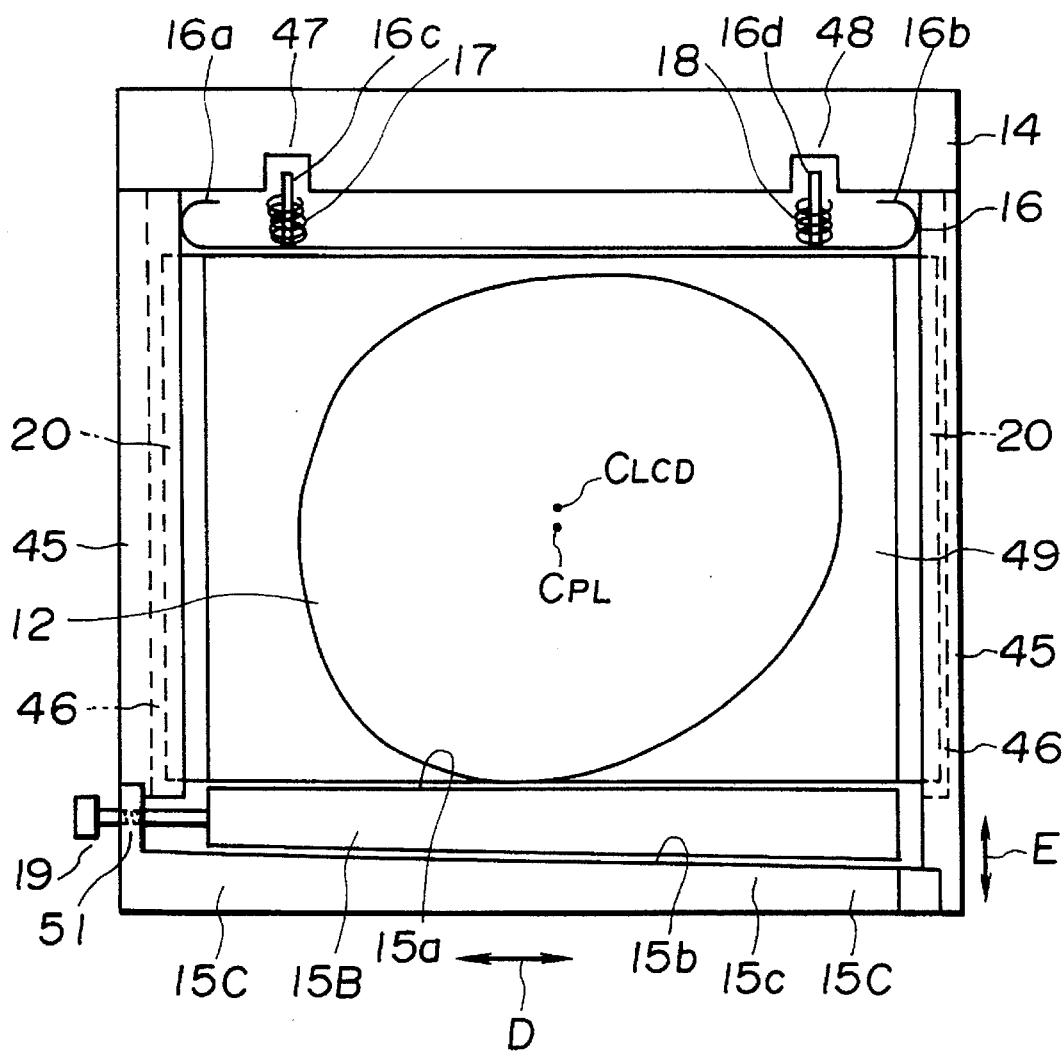
FIG. 4B is a schematic diagram of a back view of the projection lens in the optical block of FIG., 3.

The projection lens 12, which may have a diameter larger than the length of the image information radiating portion A, is positioned adjacent to a light radiating surface 2a of the micro multi-lens device 2. The projection lens 12 is contained within a holding member 49 as shown in FIG. 4B. As shown in FIG. 4B, such holding member 49 includes a spring guide 16 having ends 16a and 16b, shafts 16c and 16d, and slide guides 20. Springs 17 and 18, which may be compression-type springs, are wound around the shafts 16c and 16d, respectively. The holding member 49 is positioned such that the spring guide 16, with its rolled up ends 16a and 16b, is within a recess portion 14a of the holding member 14 and the shafts 16c and 16d are respectively aligned with holes 47 and 48 of the holding member 14. In such position, the compression-type springs 17 and 18 press against a surface 14b of the holding member 14 so as to exert a force on the spring guide 16 in the direction of the arrow C. The holding member 49 is further positioned such that slide guides 20 lie within slide openings 45 of side members 46.

The holding member 49 is further positioned so as to be in contact with the holding member 15. Such holding member 15 is adapted to impose a force upon the holding member 49 so as to cause the same to move in a direction indicated by the arrow E (FIG. 4B). More specifically, the holding member 15 includes members 15A, 15B and 15C. The member 15A is utilized for securing the image information radiating portion A in the manner previously described. The member 15B, which includes a surface 15a and a sloped surface 15b, is adapted to be slidable between the holding member 49 and the member 15C. The member 15C includes a sloped surface 15c which corresponds to that of the sloped surface 15b and which contacts the same. The member 15C further includes a hole 51 through which a shaft coupled to an adjusting knob 19 is inserted. Preferably, the hole 51 is a threaded hole and the shaft coupled to the knob 19 includes a threaded portion. The inserted end of the shaft coupled to the adjusting knob is attached to the member 15B.

As is to be appreciated, by rotating the knob 19 in one direction, the bearing end of the shaft coupled thereto exerts a force on the member 15B, thereby causing the member 15B to move in one direction along the D direction. As a result of such movement of the member 15B, the holding member 49 is moved or displaced in one direction along the E direction due to the force exerted thereon by the springs 17 and 18 (and possibly gravity) while being guided by the slide guides 20 in the slide openings 45, thereby causing the projection lens 12 to be similarly moved or displaced. By rotating the knob 19 in the other direction, the member 15B is caused to move along the D direction in the opposite direction, thereby causing the holding member 49 to be moved along the E direction in the opposite direction. Accordingly, in this latter situation, the projection lens 12 is caused to be similarly moved or displaced along the same E direction in the opposite direction.

The reason for enabling the lens 12 of the image projector apparatus 101 to be selectably movable as described above will now be described.

Figure 11:
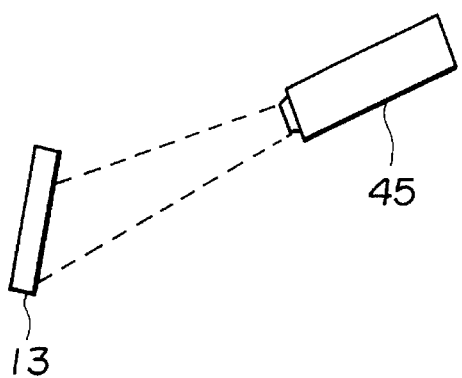
FIG. 11 is a schematic diagram illustrating the projection of light from the conventional projector of FIG. 10.

The image projector apparatus 101, like the projector 45, may be used in an airplane or the like. Accordingly, in such situation as previously described, the image projector apparatus is normally positioned in a location, such as suspended from the ceiling of the aircraft, so as not to disturb the passengers and the projection screen 13 is desirably arranged so that passengers can readily view an image displayed thereon. In such arrangement, the projector is typically positioned so as to be inclined in a downward direction relative to the projection screen (see FIG. 11) and, as a result, a keystone distortion may be produced as previously described.

Such keystone distortion may be eliminated by shifting the projection lens 12 relative to the LCD 11. In other words, by moving the projection lens 12 such that an optical axis $C_{PL}$ thereof is shifted in a direction, such as in a direction perpendicular to the $C_{PL}$ axis or in the E direction, so as to be offset from a picture center axis $C_{LCD}$ of the LCD 11, keystone distortion may be eliminated. Such shifting of the projection lens 12, while the LCD 11 remains fixed, causes the image from the LCD and projected on the screen 13 to be moved by parallel translation in the direction of movement of the projection lens. An example of such offset is illustrated in FIG. 4B, where the projection lens 12 has been moved so that the optical center axis $C_{PL}$ is lower than the picture center axis $C_{LCD}$.

Figure 9:
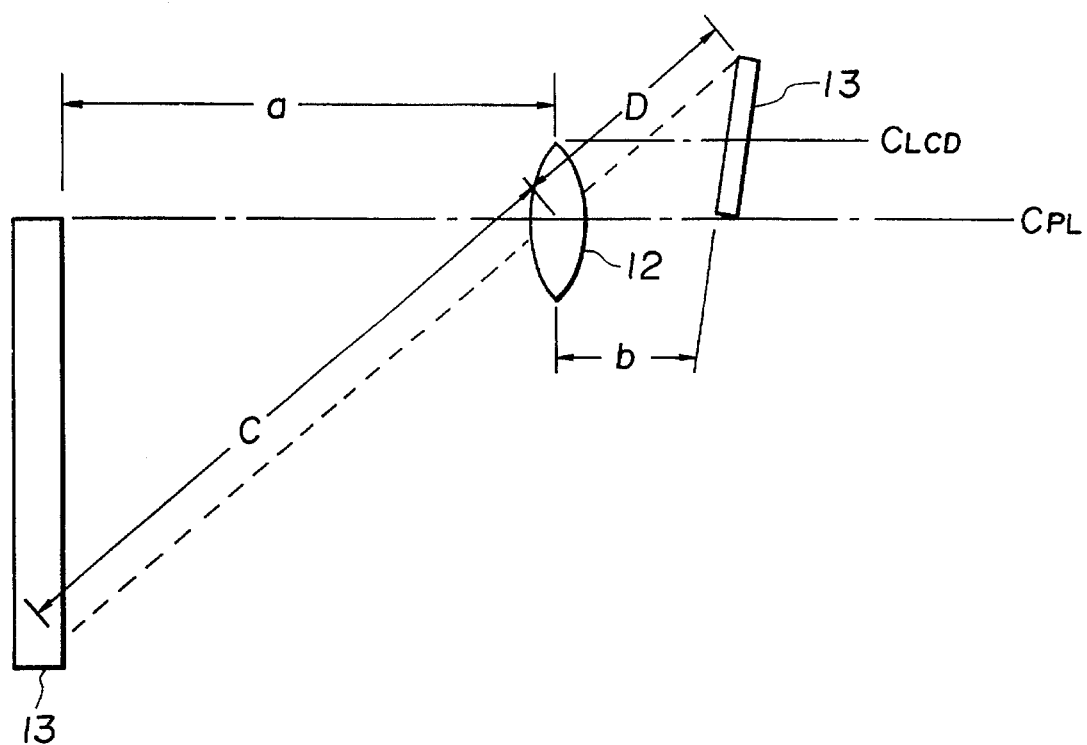
FIG. 9 is a schematic diagram to which reference will be made in explaining keystone distortion.

An example of a light path obtained by using the above-described arrangement, in which the optical center axis $C_{PL}$ of the projection lens 12 has been shifted relative to the picture center axis $C_{LCD}$, is illustrated in FIG. 9. In this arrangement, the LCD 11, the projection lens 12 and the projection screen 13 are substantially parallel to each other. With such an arrangement, the relationship a:b=c:d applies which indicates no keystone distortion.

Figure 8:
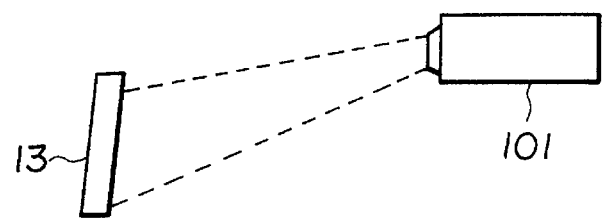
FIG. 8 is a schematic diagram illustrating the projection of image light from the image projector apparatus of the present invention onto a projection screen.

Further, such technique of moving the projection lens 12 besides compensating for keystone distortion, as previously described, also permits the image projector apparatus 101 to be mounted parallel to the ceiling of the aircraft, as illustrated in FIG. 8. That is, in such mounting arrangement, by moving or adjusting the projection lens 12, an image can be moved or adjusted accordingly so as to be properly displayed on the projection screen 13. In this mounting arrangement, the surface(s) of the LCD 11 and the display surface of the projection screen 13 are parallel to each other, thereby eliminating keystone distortion. As is to be appreciated, in addition to being mounted on the ceiling, other mounting arrangements between the image projector apparatus 101 and the projection screen 13 may be employed.

Thus, the image projector apparatus 101 can move or adjust the projection lens 12 and thereby provide an image for display on the screen 13 with no keystone distortion. On the other hand, in the projector 45 of FIG. 10, the centers of the LCD 11 and the projection lens 12 are in-line and are not moveable relative to each other.

Further, if the positions of the image projector apparatus 101 and the projection screen 13 are known, the amount of parallel translation of the image or the amount in which the projection lens 12 is to be moved can be determined. Accordingly, in this situation, the projection lens 12 can be arranged or set beforehand in the image projector apparatus in its "moved position" and, if minute adjustments are desired, the position of the projection lens 12 can be adjusted accordingly by use of the knob 19 or similar such device.

Another embodiment of the present invention will now be described with reference to FIG. 5.

Figure 5:
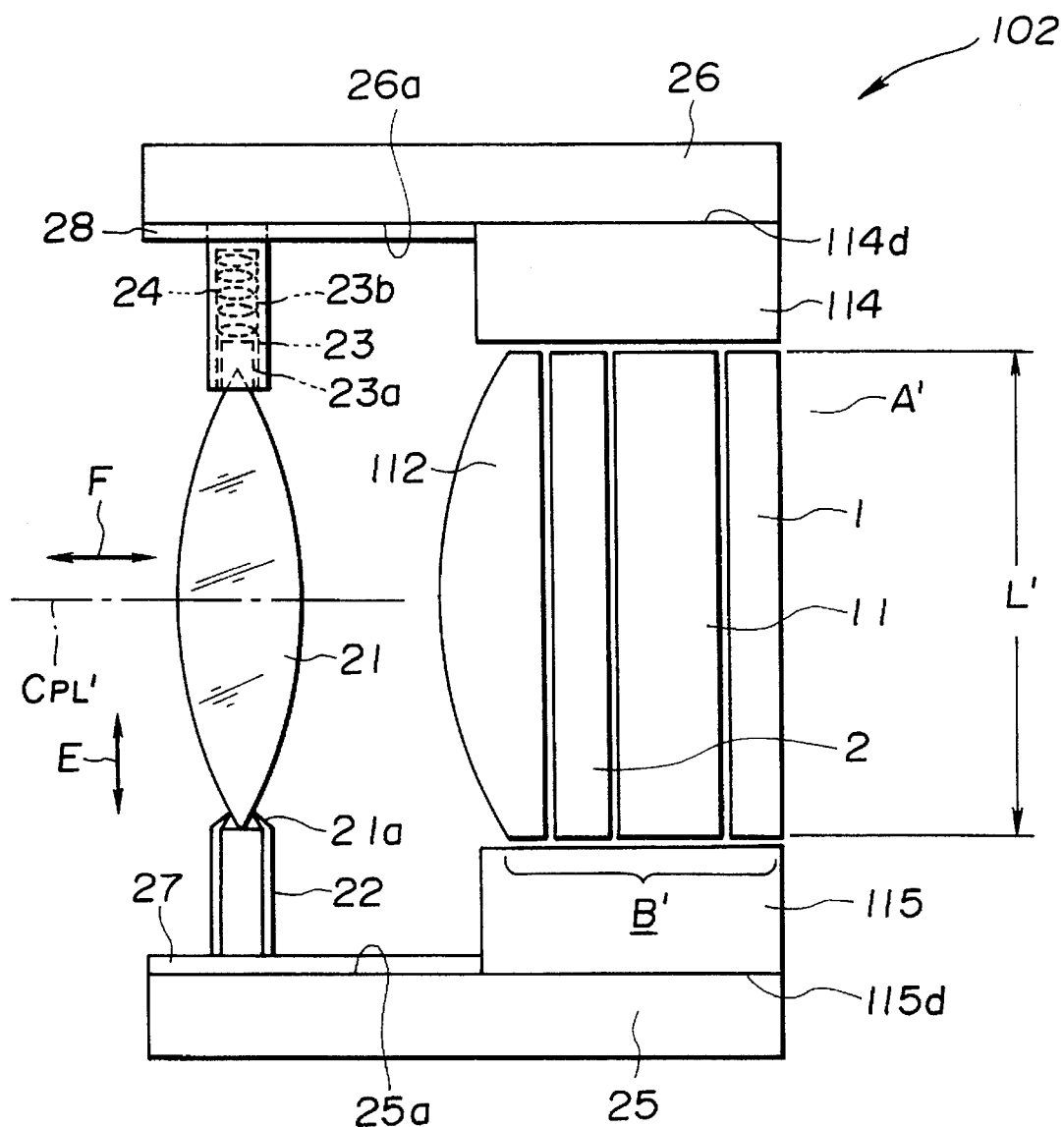
FIG. 5 is a schematic diagram of an image projector apparatus according to a second embodiment of the present invention.

FIG. 5 illustrates a portion 102 of an image projector apparatus which generally includes an optical block B' having an image information radiating portion A' and a projection lens 112, holding members 114 and 115, a second projection lens 21, lens supporting members 22 and 23, and horizontal movement extending members 25 and 26. The portion 102 may be utilized in an image projector apparatus having a light source, such as the light source 10 (FIGS. 1 and 3), and may be used with a projection screen, such as projection screen 13 (FIGS. 1 and 3).

In the portion 102, the image information radiating portion A' and the projection lens 112 are arranged to form the optical block B' and are secured by use of the holding members 114 and 115 in a manner similar to that previously described with reference to FIG. 4A except that no adjustment mechanism is provided for the projection lens 112. That is, in the portion 102, the projection lens 112 is fixedly mounted. Further, the image information radiating portion A' has a length L' which is substantially the same as the diameter of the projection lens 112. As is to be appreciated, selecting such sizes for the image information radiating portion A' and the projection lens 112 facilitates the fabrication of the optical block B'.

In the portion 102, the second projection lens 21, which is arranged between the projection lens 112 and the projection screen 13, is adapted to be moved in two directions, that is, along the directions indicated by E and F in FIG. 5.

With regard to movement along the E direction, one end 21a of the projection lens 21 is supported and fixedly secured in the lens supporting member 22. The lens supporting member 22 includes a mechanism (not shown) for causing a V-shaped member (not shown) included therein to be moved in response to the rotation or movement of an adjustment knob, which may be similar to the knob 19. As a result, the projection lens 21 may be moved in the E direction. The other end of the projection lens 21 is secured in a holding section 23a in the lens supporting member 23. The lens supporting member 23 has a recess portion 23b. A spring 24, such as a compression type spring, is arranged between the recess portion 23b and the holding section 23a. As is to be appreciated, the spring 24 may be compressed or expanded in response to the movement of the projection lens 21 and, regardless, the spring causes a holding force to be exerted on the projection lens 21 so as to securely hold the projection lens 21.

Thus, with the above-described mechanism, the projection lens 21 may be moved or shifted in the E direction, which is normal to the optical center axis $C_{PL'}$. Such shifting enables light from the portion 102 to be directed in a desired direction for display on the screen 13, without keystone distortion, even with the image projector apparatus mounted in a horizontal position, such as on the ceiling of an aircraft.

On the other hand, with regard to movement along the F direction, the lens supporting member 22 is slidably attached on a rail 27 which, in turn, is arranged on a surface 25a of the horizontal movement extending member 25. The lens supporting member 23 is slidably attached on a rail 28 which, in turn, is arranged on a surface 26a of the horizontal movement extending member 26. Such arrangement allows the lens supporting members 22 and 23 to be respectively moved along the rails 27 and 28. The horizontal movement extending members 25 and 26 and the rails 27 and 28 are positioned so that such movement is along the F direction, which is substantially parallel to the optical center axis $C_{PL'}$. Further, the optical block B' is held by holding members 114 and 115 which have surfaces 114d and 115d respectively arranged so as to be adjacent to or in contact with horizontal movement extending members 25 and 26. As a result, the projection lens 21 may be moved in the F direction (i.e., parallel to the optical center axis $C_{PL'}$) within a predetermined range, such as from the projection lens 112 to a position twice the focal length (i.e., 2f) of the projection lens 112.

The light beam from the projection lens 112 converges at a focal length f, in which the diameter of the light beam gradually diminishes throughout such length. At a focal length of 2f, the diameter of the light beam from the projection lens 112 equals the diameter of the light beam initially radiated from the projection lens 112. As a result, the projection lens 21, which may be moved in the range from the projection lens 112 or from the focal length f to the focal length 2f, can have a diameter which is substantially the same as or smaller than that of the projection lens 112.

Figure 6:
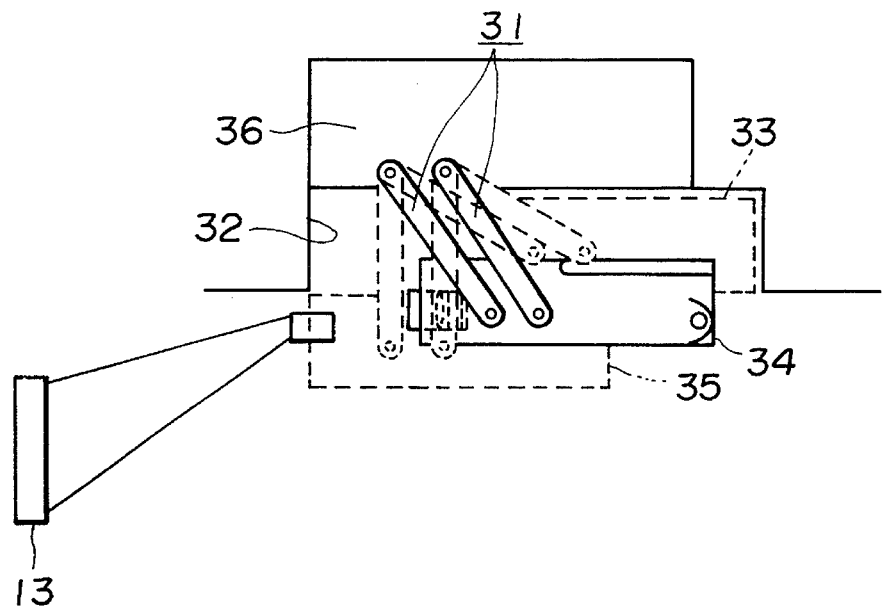
FIG. 6 is a schematic diagram of a device for holding the image projector apparatus of the present invention.

FIG. 6 illustrates an arrangement and mechanism for mounting the image projector apparatus of the present invention to the ceiling of an aircraft or the like. As shown therein, the image projector apparatus is connected to the ceiling of the aircraft by four pivotable arm members 31, two of which are preferably connected to two opposite sides of the image projector apparatus. Such arm members 31 enable the image projector apparatus to be rotatably moved to selected positions while being maintained in an orientation (e.g., a horizontal orientation) such that the optical center axis of the projection lens(es) and the picture center axis of the LCD are substantially parallel to the ceiling of the aircraft. A circuit 36 of the image projector apparatus, which may be utilized for supplying signals to and from the apparatus, may be located in the recess portion 32, or alternately may be located in an adjacent area thereto.

FIG. 6 illustrates the image projector apparatus in three horizontal positions obtained by rotatably moving the apparatus as above described. That is, reference numeral 33 illustrates the projector apparatus in a recess portion 32 of the ceiling of the aircraft. As is to be appreciated, the projector apparatus may be placed in the recess portion 32 when not in operation. Reference numeral 35 illustrates the projector apparatus in an operating location wherein images may be projected therefrom as shown in FIG. 6. Reference numeral 34 illustrates the projector apparatus in an intermediate position between the operating and the non-operating locations.

Figure 7:
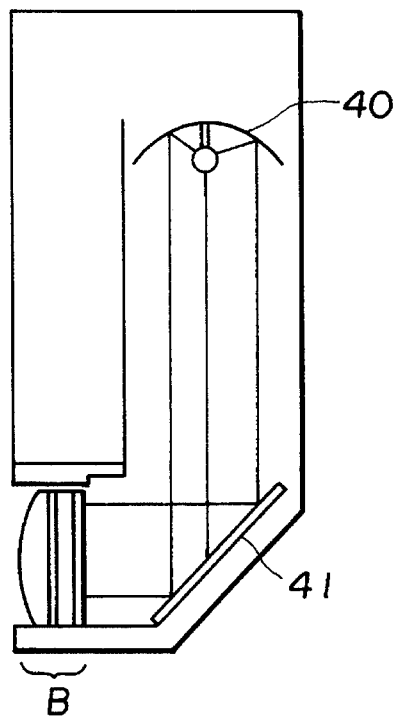
FIG. 7 is a schematic diagram illustrating an alternate position for a light source.

FIG. 7 illustrates an alternate arrangement for a light source for use with the present image projector apparatus. In such arrangement, a light source 40 is located in a position vertical to that of the previously described light source 10 and a mirror 41 is utilized to project collimated light from the light source to the optical block. Due to such arrangement, the length of the image projector apparatus may be reduced so as to have a relatively small length such as, for example, approximately 4 inches. As a result of such small length, the projector apparatus may have an overall relatively small size and relatively low weight. Such small size may be advantageous for enabling mounting of an projector apparatus in a location with limited space, such as on the ceiling on an aircraft where, as is to be appreciated, space may be scarce. Additionally, in such arrangement, the light source 40 may be substantially removed from the optical block, thereby reducing or minimizing any adverse effects in the optical block or projection lens due to the heat produced by the light source.

As is to be appreciated, in the previously described image projector apparatus using the light source 10, such light source could be further removed from the optical block in a direction parallel to the optical center axis so as to similarly reduce or minimize any adverse effects due to the heat produced by the light source on the optical block. However, in this situation, the length of the projector apparatus would be increased, thereby increasing the size, weight and the cost thereof.

Therefore, by using the first and second micro multi-lenses 1 and 2, respectively, the present image projector apparatus uses the amount of light radiated from the light source in a relatively high efficient manner so as to improve the luminance of the image and provide a picture having relatively high quality. As a result, a grainy appearance in the displayed picture, which may otherwise occur during focusing of the picture due to the relatively small openings associated with each pixel, is avoided. Further, by enabling a projection lens to be shifted in a direction normal or vertical to the optical center axis of the projection lens, or by fixedly arranging the projection lens in such shifted position, a picture may be displayed in a desired direction without any keystone distortion. The mechanism used to shift or adjust the projection lens can be relatively easily and inexpensively constructed.

Furthermore, in the embodiment of the present invention having two projection lenses, the second projection lens, which is arranged between the first projection lens and the projection screen, may be shifted in a direction normal or vertical to the optical center axis of the projection lenses, thereby permitting a picture to be moved by parallel translation so as to be displayed in a desired direction without any keystone distortion. In this embodiment, light may be transmitted from the LCD with relatively high efficiency so as to provide a projected image with a relatively high luminance level. Additionally, such arrangement of the first and second projection lenses enables the size of an image to displayed to be relatively easily controlled, without being sensitive to the focus of such image.

Furthermore, by moving the light source either in a vertical or horizontal direction away from the optical block, as previously described, thermal related adverse effects on the optical block and the LCD due to heat generated by the light source can be minimized.

Thus, the image projector apparatus of the present invention produces an image having a relatively high luminance level for display on a projection screen with no keystone distortion. As a result, the displayed image has a relatively high picture quality. Such present projector apparatus may have a relatively small size and may be easily and inexpensively constructed so as to minimize the cost thereof.

Although in describing the above image projector apparatus 100 the projection lens 12 was not described as being adapted to move in a direction normal or vertical to the optical center axis of the projection lens, such apparatus is not so limited and may be constructed so as to enable the projection lens to be moved or shifted in a manner similar to that described with reference to FIGS. 4A and 4B. Further, although in describing the present image projector apparatus one projection lens was adapted to be moved or positioned such that an optical center axis of the projection lens is offset from a picture center axis of the LCD, the present invention is not so limited. For example, as an alternate, the optical block with the LCD may be moved or positioned such that the picture center axis of the LCD is offset from the optical center axis of the projection lens.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. An image projecting apparatus for producing an image for display on a projection screen, said apparatus comprising:

means for supplying light;

first lens means having a plurality of first microlenses each adapted to receive light from said light means and to respectively project the received light therefrom;

a liquid crystal display having a plurality of pixels arranged in matrix form and a shielding mask arranged adjacent to said plurality of pixels so as to separate each of said pixels, each of said pixels respectively adapted to receive light from one of said first microlenses and project therefrom respective image light;

second lens means having a plurality of second microlenses each receiving the image light from a respective one of said plurality of pixels in said liquid crystal display for projecting parallel image light therefrom;

projection lens means receiving the parallel image light from each of said second microlenses for projecting the same onto said projection screen, said projection lens means including a projection lens having a diameter and an optical center axis; and means for moving said projection lens in a direction normal to said optical center axis;

said first lens means, said liquid crystal display and said second lens means form an image information radiating unit having a length associated therewith which is smaller than said diameter of said projection lens; and said first lens means, said liquid crystal display, said second lens means and said projection lens means are integrally arranged so as to form a single unit.

2. An image projecting apparatus as in claim 1, wherein said liquid crystal display has an image center axis and wherein the moving means moves said projection lens so that said optical center axis is non-coincident with said image center axis.

3. An image projecting apparatus for producing an image for display on a projection screen, said apparatus comprising:

means for supplying light;

first lens means having a plurality of first microlenses each adapted to receive light from said light means and to respectively project the received light therefrom;

a liquid crystal display having a plurality of pixels arranged in matrix form and a shielding mask arranged adjacent to said plurality of pixels so as to separate each of said pixels, each of said pixels respectively adapted to receive light from one of said first microlenses and project therefrom respective image light;

second lens means having a plurality of second microlenses each receiving the image light from respective one of said plurality of pixels in said liquid crystal display for projecting parallel image light therefrom, said first lens means, said liquid crystal display and said second lens means form an image information radiating unit having an image center axis;

projection lens means receiving the parallel image light from each of said second microlenses for projecting the same onto said projection screen, said projection lens means including a projection lens having an optical center axis; and means for moving one of said image information radiating unit and said projection lens in a direction normal to said optical center axis and said image center axis;

said first lens means, said liquid crystal display, said second lens means and said projection lens means are integrally arranged so as to form a single unit.

4. An image projecting apparatus as in claim 3, wherein the moving means moves one of said image information radiating unit and said projection lens so that a respective center axis corresponding to the moved one of said image information radiating unit and said projection lens in non-coincident with a respective center axis corresponding to the unmoved one of said image information radiating unit and said projection lens.

5. An image projecting apparatus as in claim 4, wherein the moving means moves said projection lens such that the optical center axis of said projection lens is non-coincident with said image center axis of said image information radiating unit.

6. An image projecting apparatus for producing an image for display on a projection screen, said apparatus comprising:

means for supplying light;

first lens means having a plurality of first microlenses each adapted to receive light from said light means and to respectively project the received light therefrom;

a liquid crystal display having a plurality of pixels arranged in matrix form and a shielding mask arranged adjacent to said plurality of pixels so as to separate each of said pixels, each of said pixels respectively adapted to receive light from one of said first microlenses and project therefrom respective image light;

second lens means having a plurality of second microlenses each receiving the image light from a respective one of said plurality of pixels in said liquid crystal display for projecting parallel image light therefrom;

a first projection lens for receiving the parallel image light from each of said second microlenses and for projecting the same therefrom, in which said first lens means, said liquid crystal display, said second lens means and said first projection lens are integrally arranged to form an optical unit;

a second projection lens for receiving the light from said first projection lens and for projecting the same onto said projection screen; and means for moving said second projection lens in two directions which are substantially perpendicular to each other.

7. An image projecting apparatus as in claim 6, wherein said first lens means, said liquid crystal display and said second lens means form an image information radiating unit having a length associated therewith and wherein said first projection lens has a diameter which is substantially equal to the length of said image information radiating unit.

8. An image projecting apparatus as in claim 6, wherein said second projection lens has an optical axis and said optical unit has a center axis and wherein said second projection lens is arranged such that the optical axis and the center axis are non-coincident with each other.

9. An image projecting apparatus as in claim 6, further comprising means for generating a control signal and for supplying the same to said liquid crystal display and wherein said liquid crystal display is responsive to said control signal for controlling the amount of light received by each of said pixels.

10. An image projecting apparatus as in claim 7, wherein the moving means moves said second projection lens such that an optical center axis of said second projection lens is non-coincident with an optical center axis of said first projection lens and an image center axis of said image information radiating unit.

11. An image projecting apparatus as in claim 6, wherein said first lens means, said liquid crystal display and said second lens means form an image information radiating unit having an image center axis and wherein the light supply means is positioned such that its center does not lie along said image center axis.

12. An image projecting apparatus as in claim 11 further comprising a mirror for receiving light from said light supply means and for reflecting the received light to said first lens means.

13. An image projecting apparatus for producing an image for display on a projection screen, said apparatus comprising:

a projector device having means for supplying light; first lens means having a plurality of first microlenses each adapted to receive light from said light means and to respectively project the received light therefrom; a liquid crystal display having a plurality of pixels arranged in matrix form and a shielding mask arranged adjacent to said plurality of pixels so as to separate each of said pixels, each of said pixels respectively adapted to receive light from one of said first microlenses and project therefrom respective image light; second lens means having a plurality of second microlenses each receiving the image light from a respective one of said plurality of pixels in said liquid crystal display for projecting parallel image light therefrom; a first projection lens for receiving the parallel image light from each of said second microlenses and for projecting the same therefrom, in which said first lens means, said liquid crystal display, said second lens means and said first projection lens are integrally arranged to form an optical unit; a second projection lens for receiving the light from said first projection lens and for projecting the same onto said projection screen; and means for moving said second projection lens in two directions which are substantially perpendicular to each other; and means coupled to a ceiling of an aircraft for mounting said projector device thereat and for enabling said projector device to be positioned in a plurality of positions.

14. An image projecting apparatus as in claim 13, wherein said means for mounting and enabling maintains and positions said projector device in a constant orientation.

15. An image projecting apparatus as in claim 14, wherein said optical unit has a center axis, and wherein said second projection lens has an optical axis, and wherein said constant orientation is one in which said center axis and said optical axis are substantially parallel to the ceiling of said aircraft.

* * * * *